United States Patent [19]

Blatter

[11] Patent Number: 4,663,659
[45] Date of Patent: May 5, 1987

[54] VIDEO SIGNAL SCRAMBLING SYSTEM EMPLOYING FULL LINE REVERSAL AND DOUBLE BURST CODING

[75] Inventor: Harold Blatter, Indianapolis, Ind.

[73] Assignee: RCA Corporation, Princeton, N.J.

[21] Appl. No.: 793,185

[22] Filed: Oct. 31, 1985

[51] Int. Cl.$^4$ .............................................. H04N 7/167
[52] U.S. Cl. ....................................... 380/14; 358/19; 358/326
[58] Field of Search ........................... 358/119, 326, 19

[56] References Cited

U.S. PATENT DOCUMENTS

| | | | |
|---|---|---|---|
| 3,379,825 | 4/1968 | Banning, Jr. ........................ | 178/5.1 |
| 4,070,693 | 1/1978 | Shutterly ............................. | 358/123 |
| 4,405,942 | 9/1983 | Block et al. ........................ | 358/119 |

*Primary Examiner*—Stephen C. Buczinski
*Attorney, Agent, or Firm*—P. J. Rasmussen; P. M. Emanuel; R. G. Coalter

[57] ABSTRACT

A memory reverses the sequence of samples of selected lines of a composite video input signal without separating the color burst and chrominance components of the lines thereby preserving chroma-burst phase integrity of scrambled lines. A burst inserter adds a second color burst component to the normal and reversed sequence lines to preserve the secrecy of the scramble code. A descrambler includes a memory for restoring the sample sequence and removing the extra color burst component.

16 Claims, 13 Drawing Figures

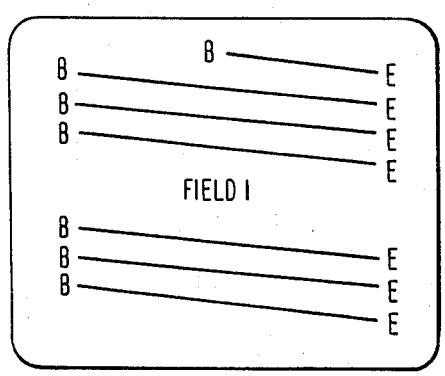
Fig. 4A    FIELD 1    NON-REVERSED
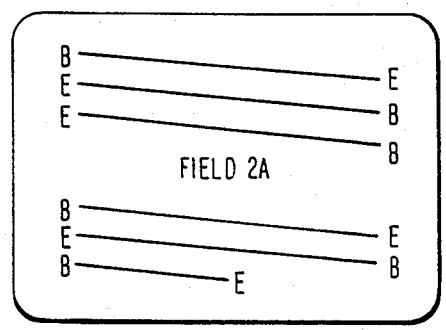
Fig. 4B    FIELD 2A    INTRA-FIELD REVERSAL
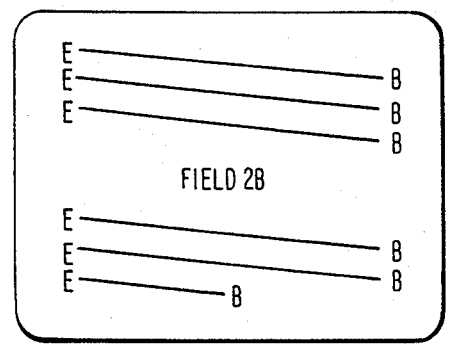
Fig. 4C    FIELD 2B    INTER-FIELD REVERSAL

4,663,659

VIDEO SIGNAL SCRAMBLING SYSTEM EMPLOYING FULL LINE REVERSAL AND DOUBLE BURST CODING

FIELD OF THE INVENTION

This invention relates to television systems and particularly to systems for scrambling and unscrambling video signals by means of line reversal processing.

BACKGROUND OF THE INVENTION

It is desirable to encode television signals to provide secure transmission in applications such as cable TV, satellite transmission and subscription broadcast television. Known coding arrangements may be considered, generally speaking, to be of either the amplitude alteration type or of the time sequence alteration type. Amplitude encoders include, illustratively, those which alter the vertical or horizontal synchronizing pulse amplitude or which modulate the video signal with an encoding waveform (e.g., a sinewave) and have an advantage in that the decoder may be relatively simple and inexpensive. A disadvantage of amplitude encoding is that, generally speaking, the codes are rather easily recognized and deciphered, thus creating a potential "black market" for unauthorized decoders. From a technical standpoint, the amplitude distortion imparted to the video signal may not be completely removed by the decoder and critical decoder adjustments may be required to reduce the residual distortion of the decoded signal to acceptable levels. Other problem areas associated with scramblers of the amplitude alteration type include signal-to-noise ratio degradation and loss of dynamic range.

Encoders of the time sequence alteration type reorder the video signal sequence so as to create a non-standard signal sequence which may be charged at random so as to provide a very high level of security. As an example, in the system described by T. A. Banning, Jr. in U.S. Pat. No. 3,379,825 entitled SUBSCRIPTION TELEVISION SYSTEM HAVING RASTER DISTORTION which issued Apr. 23, 1968, a video signal is scrambled by reversing the horizontal scan direction of a camera and descrambled by reversing the scan direction of the kinescope of a receiver. In the camera conventional horizontal sync pulses are added to the reversed "active" video signal. Such an arrangement avoids the amplitude and sync distortion problems characteristic of amplitude alteration and sync suppression systems but requires the use of special television receivers and cameras having bidirectional horizontal deflection circuits.

It is known that the disadvantage of the Banning Jr. system (i.e., the need for a special camera and receiver) may be overcome by employing video memories to facilitate line reversal and re-reversed rather than changing the actual direction of scan in a camera or receiver. Such a system is described by Block et al. in U.S. Pat. No. 4,405,942 entitled METHOD AND SYSTEM FOR SECURE TRANSMISSION AND RECEPTION OF VIDEO INFORMATION, PARTICULARLY FOR TELEVISION which issued Sept. 20, 1983. In an embodiment of the Block et al. system a horizontal line of video signal is stored in a bidirectional shift register. When shifted in the "forward" direction the register functions as a first-in first-out (FIFO) memory and provides a video output signal in which the sequence of picture elements is identical to the original line. The sample sequence is reversed by shifting the register in the "reverse" direction so as to operate as a first-in last-out (FILO) memory. As in the system of Banning Jr., Block et al. scramble the active video portion of the video input signal and then multiplex conventional sync and blanking signals with the scrambled active video portion to form a complete line of the processed output signal.

SUMMARY OF THE INVENTION

It is herein recognized that a potential problem concerning color fidelity exists in line reversing scrambling systems of the general type described when composite video signals are scrambled by reversing the element sequence of only the "active" portion of a line and processing the synchronizing portion of the signal differently. In a composite video signal the color burst component resides on the "back porch" of the horizontal synchronizing signal. If the active portion of a line is scrambled without including the color burst component a timing error can result when the active portion is descrambled and reunited with the color burst signal. Since the phase of burst conveys the hue of the associated chrominance component of the video signal, the separate processing of the active video portion of a line can introduce undesirable color shifts which may be difficult to control or correct.

One might consider avoiding the problem of color shift by the expedient of scrambling the color burst component along with the active video portion of a line by simply reversing the sequence of the line from the beginning of burst to the end of the active video signal. Indeed, this will solve the color shift problem but, unfortunately, it also destroys the security of the scrambling system. The reason is that when the line is reversed the burst component will appear at the end of the line and so will act as a "flag" clearly identifying whether or not the line had been reversed. Thus one need only detect the burst location to decode the scrambled signal.

The present invention is directed to solving both of the aforementioned problems, namely: (1) preserving the phase relationship of burst and chroma in the processing of the composite video signal; and (2) preserving the integrity of the scrambled signal by avoiding tell-tale flags which might indicate reversal or non-reversal of the scrambled line.

The principles of the invention apply to composite video signal scrambling systems of the type which include means for reversing the time sequence of segments of selected lines of a video input signal to provide a scrambled output signal in which selected lines comprises segments of reverse sequence and other lines comprise segments of non-reversed sequence. In accordance with the invention means are provided for reversing the sequence all segments associated with each selected line and for adding an extra burst signal to all lines of the scrambled signal.

BRIEF DESCRIPTION OF THE DRAWING

The invention is illustrated in the accompanying drawing wherein like elements are denoted by like reference designators and in which:

FIGS. 4A-4C are scanning diagrams associated with the system of FIG. 1;

DETAILED DESCRIPTION

Figure 1:
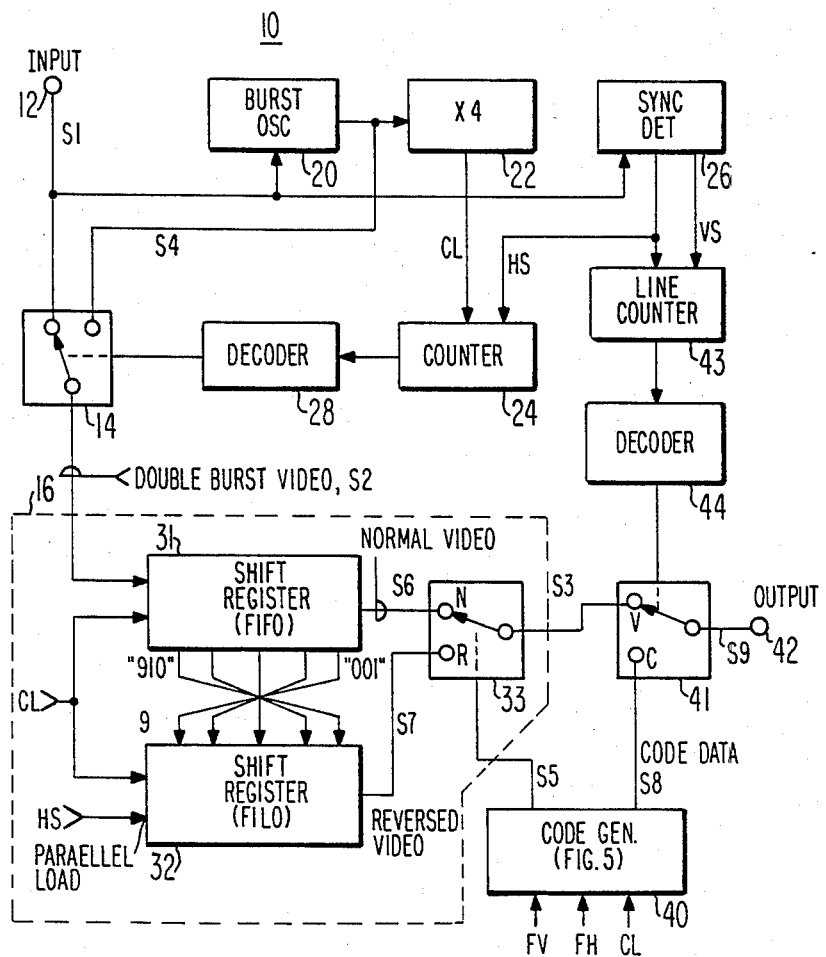
FIG. 1 is a block diagram of a video signal scrambler embodying the invention.
Figure 2:
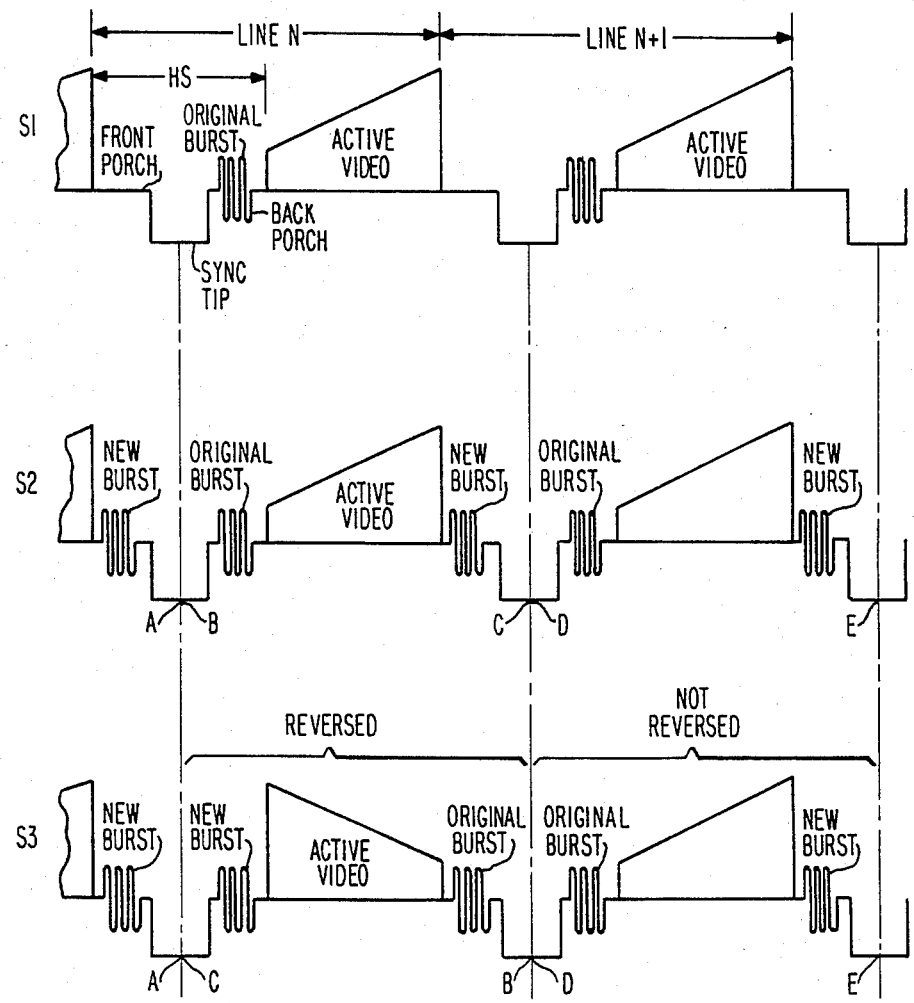
FIG. 2 is a waveform diagram illustrating certain aspects of operation of the scrambler of FIG. 1.

The scrambler 10 of FIG. 1 includes an input terminal 12 for receiving a composite video input signal S1 of conventional form as shown in FIG. 2. Each line of signal S1 includes a horizontal synchronizing interval ("HS") and an active video interval ("Active Video"). The term "active video" refers to elements of a line which are displayed by a receiver i.e., picture elements or "pixels". Interval HS, as is known, facilitates display timing and comprises a synchronizing pulse having "front porch", "sync tip" and "back porch" portions. A color burst signal ("original burst") is located on the back porch of HS for decoding the chroma portion of the active video signal. With the exception of certain lines in the vertical blanking interval of signal S1, each line of a given field includes a color burst and a active video component as shown.

Input terminal 12, in this example of the invention, is coupled to a switch 14 which inserts a color burst signal S4 on the front porch interval of signal S1 to provide a composite video signal S2 having a pair of color burst components symmetrically disposed with respect to the active video signal component as shown by waveform S2 of FIG. 2. Stated in terms of the horizontal synchronizing interval HS, the added color burst ("new burst") signal is symmetrical with the original color burst signal relative to the center of the sync-tip interval (AB or CD). Accordingly, at this stage in the signal processing, signal S2 differs from the input signal S1 in that it includes a pair of burst components symmetrically disposed about the active video component or, viewed another way, symmetrically disposed about the center of the sync-tip interval.

The double burst signal S2 is applied to a memory unit 16 (outlined in phantom) which reverses the sequence of all elements of selected lines of signal S2 to provide a scrambled signal S3 in which all lines include two symmetrically disposed color burst components and in which the sequence of samples of the active video and color burst components is reversed as shown by waveform S3 of FIG. 2. In line "N" elements B-C are reversed. Elements D-E are not reversed in line "N+1".

Signal S3 thus meets the dual objects of the invention, specifically: (1) the color burst component is processed with the active video component of each line; and (2) there is no indication in the synchronizing interval of whether a line has been reversed or not reversed. Note, particularly, that the format of the reversed line N is exactly the same as that of the non-reversed line N+1 and in both lines the original burst component is not separated from its associated active video component.

The advantages of this scrambling format, as previously explained, are that: (1) color (hue) errors are avoided since the original burst component is never separated from the associated active video component of a line; and (2) the integrity (security) of the scrambling code is preserved because each line exhibits symmetry. Note that if an additional burst signal was not added as shown, one could detect the position of the burst component of the output signal to determine if the line was reversed (burst following active video) or not reversed (burst preceding active video).

Considering now the details of color burst insertion in scrambler 10, signal S1 is applied to a burst oscillator 20 which provides the regenerated burst signal component S4 that is inserted in signal S3 by switch 14 as previously explained. Timing signals for controlling switch 14 are provided by a frequency quadrupler 22 which multiplies the frequency (Fsc) of the regenerated color burst signal S4 to provide a clock signal CL at four times the color subcarrier frequency (4 Fsc) of input signal S1. Since there are 227.5 cycles of the color subcarrier in the NTSC system, the 4 Fsc clock signal CL provides 910 pulses per line. Clock pulses CL are counted by a counter 24 that is reset at the start of each line by means of horizontal sync pulses HS provided by a sync detector 26. A decoder 28 decodes the count provided by counter 24 for controlling switch 14. During the front porch interval of signal S1 switch 14 is changed over for 32 counts for inserting 8 cycles of the regenerated burst signal S4 (see FIG. 3).

Figure 3:
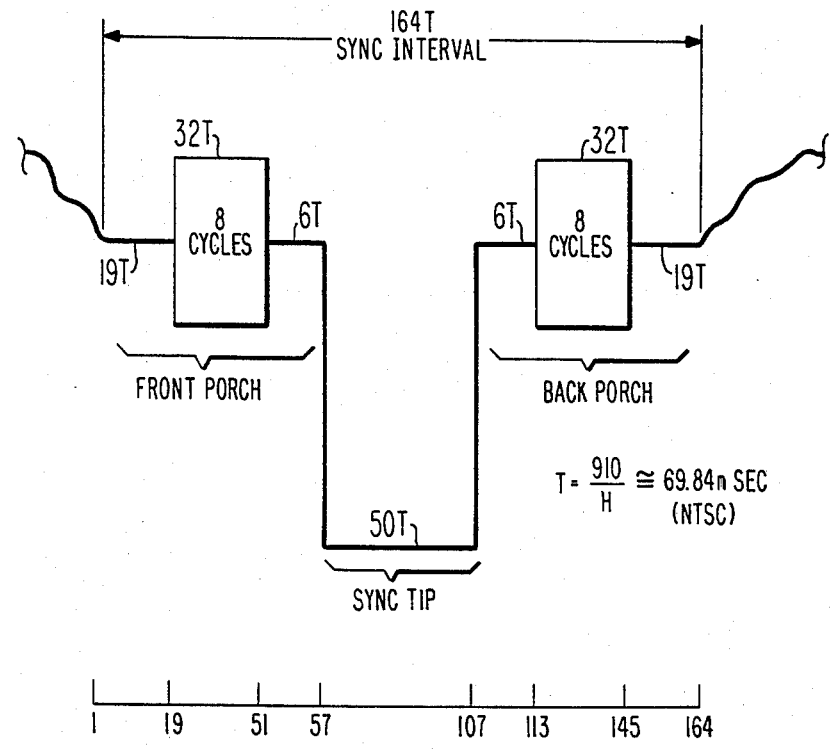
FIG. 3 is a diagram illustrating timing details of double color burst placement in the system of FIG. 1.
Figure 7:
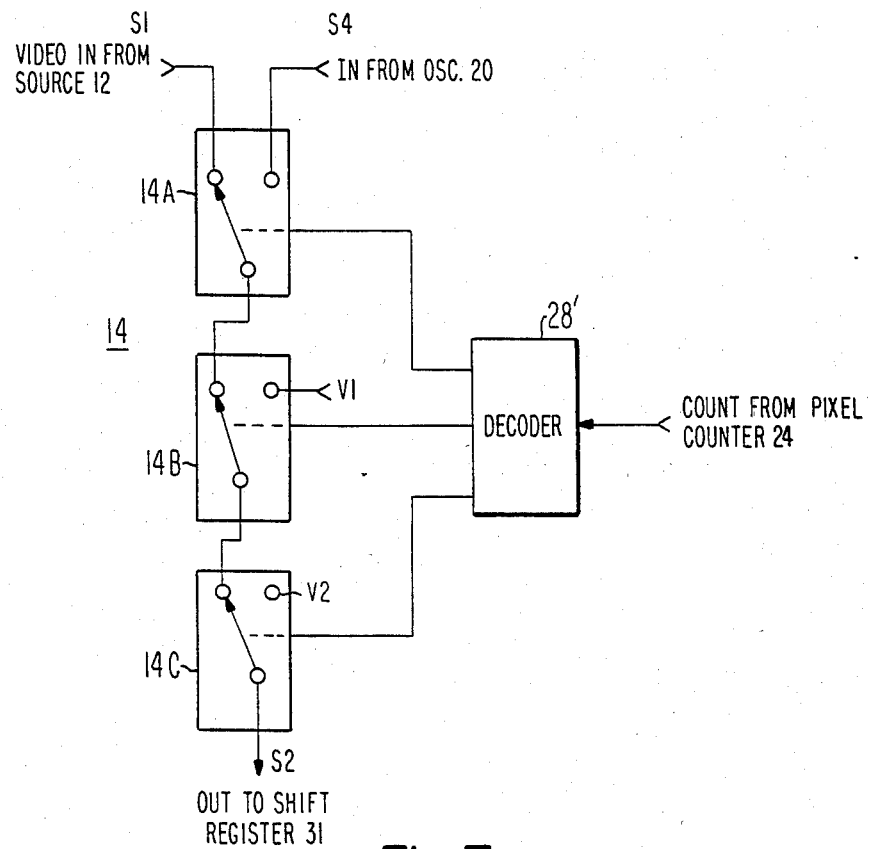
FIG. 7 is a block diagram of a burst insertion and sync clamping unit for use in the scrambler of FIG. 1.

FIG. 7 provides a detailed block diagram of a preferred implementation of switch 14 and FIG. 3 provides additional timing details. In FIG. 7 switch 14 is implemented as a cascade connection of three switches controlled by decoder 28'. Switch 14A inserts a burst component (S4) on the front and back porches of signal S1. Switch 14B clamps signal S1 to blanking level (V1) and switch 14C clamps signal S1 to sync tip level for the specific times indicated in FIG. 3. Time intervals, T, are determined by dividing the maximum number of counts per line (910 for an NTSC signal with clocking at 4 Fsc) by the line period, H. One clock interval, T, thus equals 69.84 nano-seconds for the assumed conditions.

Memory 16 comprises a pair of one line (1-H) shift registers 31 and 32 which store each line of video signal S2 and a switch 33 controlled by a scramble code signal S5 for selecting non-reversed (S6) and reversed (S7) video output signals of the registers. The scrambling code signal is provided by a code generator 40 as will be described. Signal S2 is applied to the serial input of register 31 which is clocked by signal CL and thus acts as a first-in first-out (FIFO) register which delays signal S2 by one line. Parallel outputs ("910" to "001") of register 31 are connected in reverse order to parallel inputs of register 32 which is "loaded" at the start of each line by means of signal HS applied to its parallel load input. Accordingly, register 32 acts as a first-in last-out (FILO) register and therefor provides an output signal S7 in which the sample order for each line is reversed. Since the register length is one full line (910 samples, 63.5 microseconds) the chrominance component is not separated from the color burst component thereby preventing the possibility of color shifts upon decoding as previously explained. If desired memory 16 may be implemented as previously described in the Block et al. patent (e.g., a bidirectional shift register) by increasing the register storage capacity of the Block et al. apparatus to one full line.

The scrambling code signal S5 that controls the selection of reversed (S7) and non-reversed (S6) video signals may be changed on a line-by-line basis as shown in FIG. 4B or on a field-by-field basis as shown by FIG. 4C. The latter form of scrambling, wherein some fields are not reversed (FIG. 4A) and others are reversed (FIG. 4C) has a particular advantage in applications where the scrambled signal may be tape recorded and played back prior to descrambling. Some video tape recorders employ an error concealment technique wherein signal drop-outs within a line are masked by means of a memory controlled to substitute video from a previous line when a drop-out occurs. If, for example, a drop-out occurs on a reversed line when playing back a signal scrambled on an intra-field basis (FIG. 4B), then the substitute video signal (the "cover-up") might be taken from a previous line in which the elements are non-reversed. The recorder error concealment system, in that case, would only make the drop-out more noticeable. This potential problem is avoided by only reversing the lines on a field-by-field (or frame-by-frame) basis. If a drop-out then occurs it follows that only reversed lines will be substituted for reversed lines in any given field (4C) and only non-reversed lines will be substituted for non-reversed lines (4A) in other fields.

The remaining elements of FIG. 1 comprise a switch 41 inserting a scrambling code data signal S8 provided by generator 40 in the vertical blanking interval of signal S3 to provide a scrambled and encoded output signal S9 at terminal 42. Timing signals for controlling switch 41 are provided by a decoder 44 which decodes line numbers of each field provided by a line counter 43. In operation, decoder 44 causes switch 41 to select the data signal S8 during lines 4, 8 and 12 of the vertical blanking interval of each field.

Figure 5:
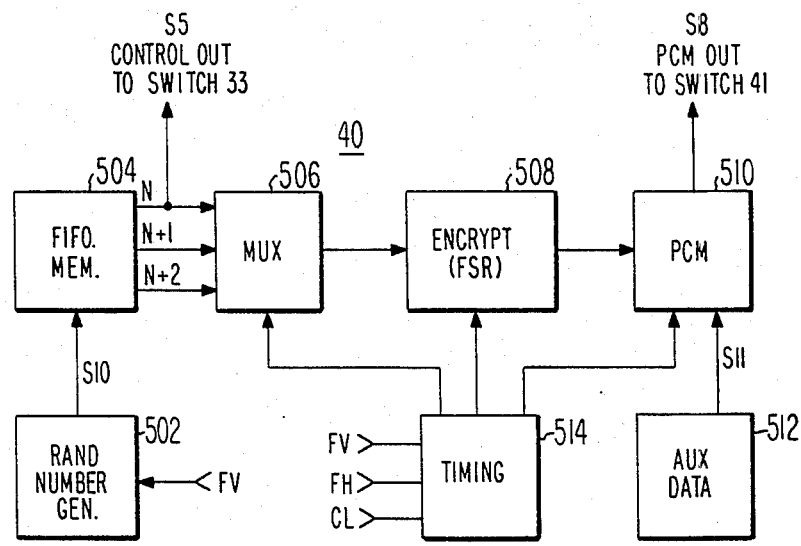
FIG. 5 is a detailed block diagram of a scrambling code generator suitable for use in the scrambler of FIG. 1.
Figure 6:
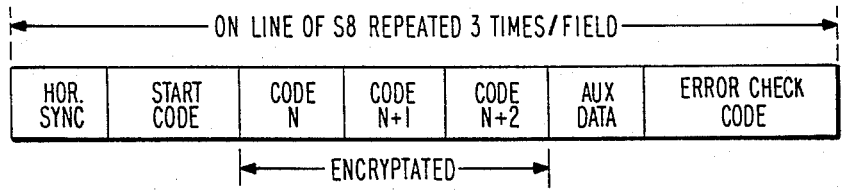
FIG. 6 is a diagram illustrating the code format of the generator of FIG. 5.

The scrambling code data signal S8 is a pulse code modulated (PCM) signal which conveys an encryptated version of the scrambling signal S5 to ensure that only authorized users having a suitable decoder can recover the scrambling signal. The code format is shown in FIG. 6 and details of a suitable generator (40) are shown in FIG. 5. Generator 40 (FIG. 5) comprises a random number generator 502 (clocked by the vertical sync signal FV) that provides a random number signal S10 which is stored in a first-in first-out memory 504 having three outputs for providing the current field (N) scrambling code (S5) and the codes for the next two following fields (N+1 and N+2). A multiplex switch 506 sequentially selects the codes for fields N, N+1 and N+2 during each line and applies them to an encryption unit 508 (e.g., a conventional feedback shift register FSR encoder). After encryption, the scrambling code data is applied to a PCM encoder 510 along with an auxilliary data signal S11 provided by an auxilliary data source 512. Synchronization of units 506-510 is provided by a timing signal generator 514.

In operation, PCM processor 510 inserts a start code in signal S8 after horizontal sync (see FIG. 6) for use in synchronizing a similar PCM processor in a decoder. The start code is followed by the encrypted scramble code data for the current field (N) and next two following fields (N+1, N+2). The remainder of the line comprises the auxiliary data signal (S11) and an error check code. The error check code is used in a decoder for identifying or "flagging" the status of each received code line as being either error free ("valid" status) or erroneous ("invalid" status). The auxiliary data may be used for various purposes such as program source identification, customer authorization codes, etc.

From the discussion of FIG. 1 it was seen that the code signal S8 was inserted on three lines (4, 8, 12) of the vertical blanking interval thereby providing intra-field redundancy. Inter-field redundancy is also provided in the generator 40 by the inclusion of the code for the current field (N) and the next two following fields. There are thus nine ways possible to recover the scrambling code for a field since the code for any field is present three times within the current field and three times in each of the previous two fields. This redundancy within a field and from field-to-field is advantageous in minimizing the possibility of the occurrence of what will be referred to as a "full field blink".

Specifically, recall that in a preferred method of operation the scrambling code is changed on a field-by-field basis to avoid the problems associated with video tape recorder drop-outs. If, for some reason the correct scramble code for a given field is received in error and not detected, then all lines of the field will be in error (all reversed or all not reversed). The visual effect in such a case is that the entire field flashes a reversed image hence the term "full field blink". This problem is avoided by the high level of line and field redundancy in combination with the use of an error check code that flags the status of each line. As explained in detail regarding FIGS. 8 and 9, one need only detect one single line of code of the nine lines spread over three fields to correctly recover the scrambling code. It is highly unlikely that all nine lines would be in error and thus the chance of a full field blink occurring are small.

Figure 8:
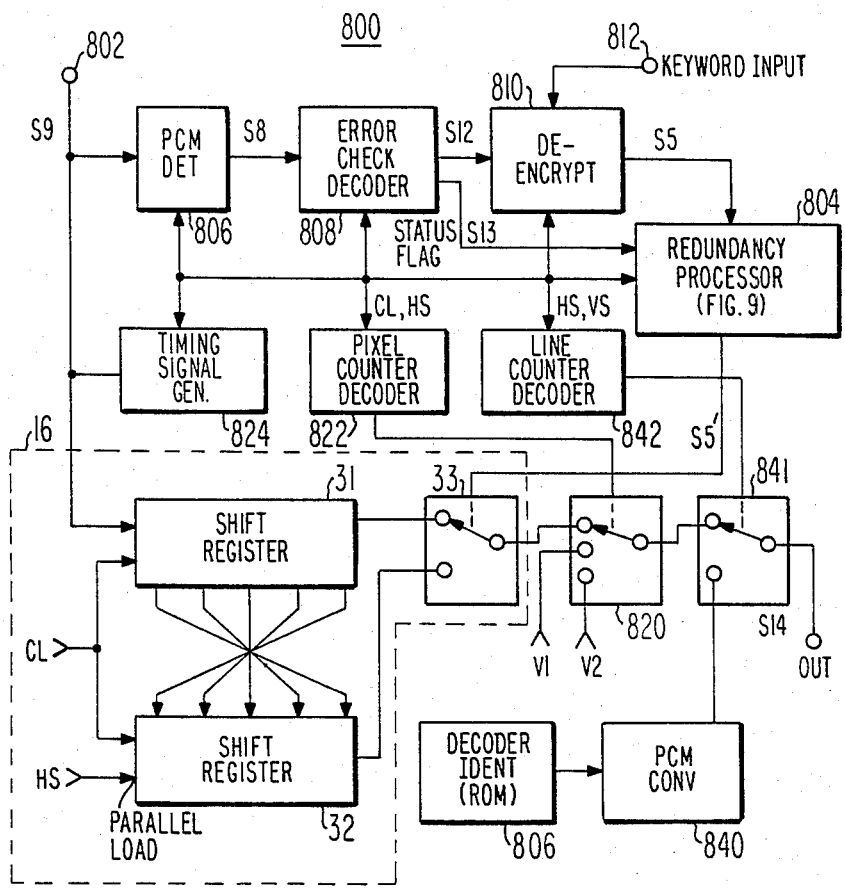
FIG. 8 is a block diagram of a descrambler embodying the invention.

Decoder 800 of FIG. 8 provides the complementary functions of encoder 10 of FIG. 1, namely, descrambling and color burst removal. Additionally, the decoder includes a redundancy processing unit 804 (FIG. 9) that minimizes the probability of scrambling code signal errors causing a "full field blink" as previously described. Also included is an identification read only memory (ROM) that is used to insert a unique decoder identification code in the scrambled output signal S10 as an aid in identifying the source of unauthorized tape copies made by an unauthorized user (tape "pirate") of the decoder.

In the decoder 800, memory unit 16 functions as previously described to reverse the sequence of elements of each line of each field of the scrambled input signal S9 (applied to input 802) as identified by the scrambling code signal S5 provided by the redundancy processing unit 804. Signal S5 is recovered from the input signal S9 by means of a PCM detector which detects and supplies the PCM Code S8 (see FIG. 6) to an error check decoder 808. After error check decoding the encrypted codes (signal S12) for the current field (N) and the next two fields (N+1 and N+2) are applied to a de-encryption unit 810 having an input 812 for receiving a user supplied authorization code ("keyword"). The user code may be supplied by a keyboard entry device, a ROM or some other suitable means (not shown) connected to terminal 812. When unit 810 is enabled by the keyword code it de-encryptates the scrambled field identification data to provide the original scramble code signal S5.

The scramble code signal S5 provided by unit 810 could be applied directly to switch 31 in memory 16 for descrambling signal S9. Since in this example of the invention all lines of a field are either reversed (FIG. 4A) or non-reversed (FIG. 4B), any error in signal S5 could result in all lines of a field being in error thus causing the "full field blink" problem previously described. This is avoided by the inter-field and intra-field redundant coding of signal S5. Redundancy processor 804 stores the codes sent during lines 4, 8 and 12 of three consecutive fields along with the data status flag (S13) provided by error check decoder 808. Any stored code identified by the status flag (one bit) as being invalid is simply ignored. Since there are three lines of data per field (see FIG. 6) each containing data for three fields there are thus nine ways to recover the scrambling data and thus a very low probability of a "full field blink" occurring.

Figure 9:
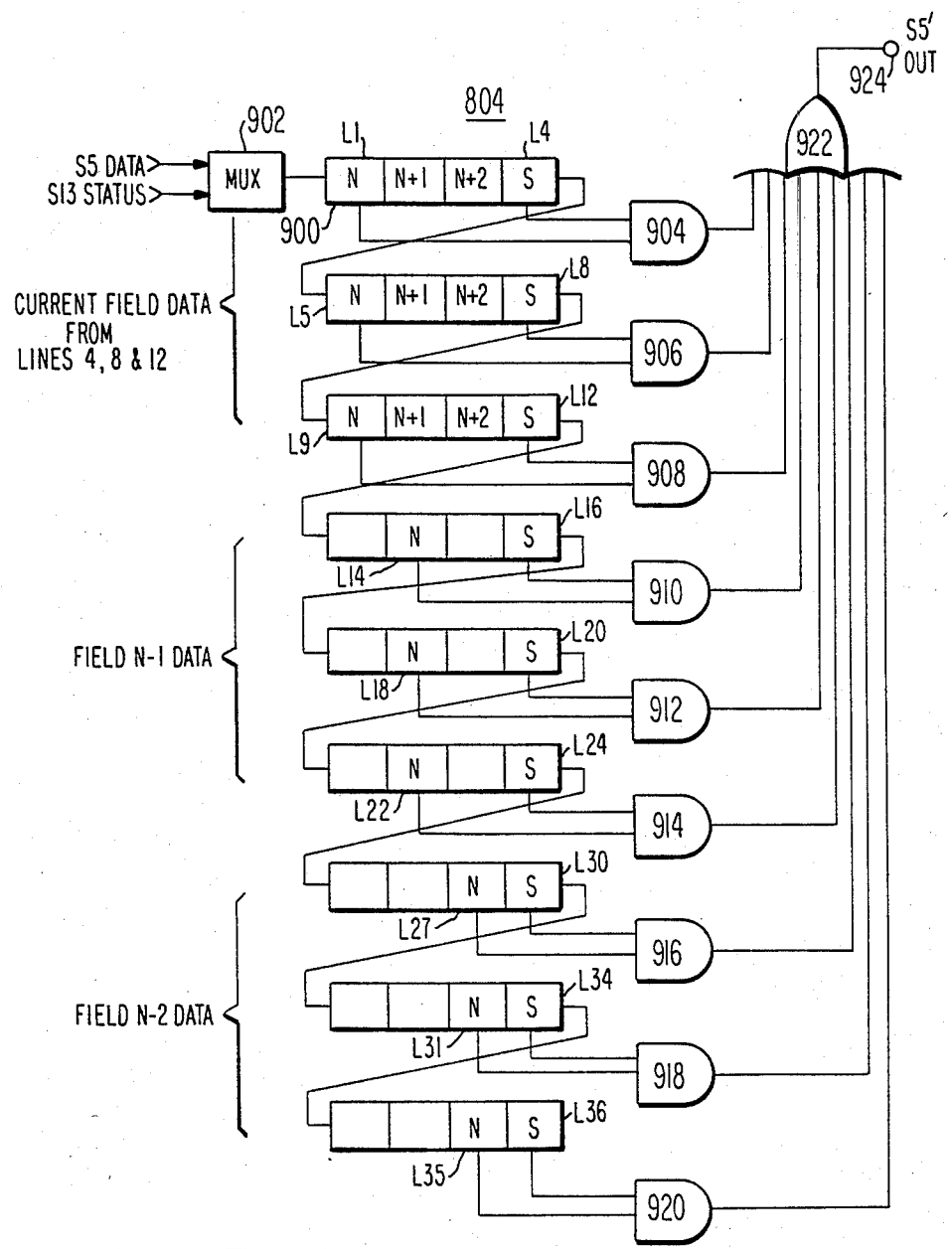
FIG. 9 is a detailed block diagram of a redundancy processing unit suitable for use in the descrambler of FIG. 8.

Redundancy processing unit 804 may be constructed as shown in FIG. 9. The de-encrypted data signal S5 and data validity (status) signal S13 are applied to a thirty six bit shift register 900 via a multiplex switch 902 which stores the data for each line and the associated status ("S") bit as shown. Valid data of each line is signified by a logic ONE in the status bit location. Invalid data is signified by a logic ZERO.

A plurality of AND gates 904-920 compare the data (N) for each of the nine lines with the corresponding status flags (S). For the currently received field, the scrambling code data N is stored at locations L1, L5 and L9. The same data from the previous field (N−1) is stored at locatins L14, L18 and L22. The data of the current field (N) which was sent two fields earlier is stored at location L27, L31, L35. The outputs of all AND gates are connected to a nine-input OR gate 922. In operation, if any one or more of the nine status flags are ONE (indicating validity) then the associated AND gate will be primed and will therefor produce a HIGH output signal if N=1 and a LOW output signal if N=0. Since all AND gates are connected to OR gate 922, only one status flag needs to be HIGH (valid) to control gate 922 and thus provide the scramble code S5'. If none of the status flags are HIGH, then all AND gates are disabled and the output of gate 922 will be LOW regardless of the value of the (invalid) data N. In this default condition (complete failure to receive any valid data) memory 16 operates in the non-reversing mode, that is, it does not reverse the video signal. Accordingly, if one applies a conventional video signal to the descrambler, the absence of the valid scrambling data is detected and the descrambler is automatically placed in a non-descrambling mode.

The extra burst component of the descrambled video signal is removed in FIG. 8 by switch 820 controlled by a pixel counter and decoder unit 822 provided with 4 Fsc clock signals and horizontal sync signals HS from a timing unit 824. In operation switch 820 selects the output of memory 16 during the active portion of the video. During the front porch and sync-tip intervals switch 820 selects blanking level and sync-tip level voltages V1 and V2, respectively, thereby removing the extra burst component (FIG. 3, previously discussed, provides timing details of the synchronizing interval).

The remaining elements of FIG. 8 insert an identification code in the descrambled output signal (S10) as an aid in detecting unauthorized use of the decoder. A decoder identification number provided by ROM 806 is converted to PCM form by convertor 820 and inserted in the vertical blanking interval of the descrambled output signal S14 by means of multiplex switch 841 controlled by a line counter and decoder unit 842. In operation, if someone uses the descrambler to make video tape recordings of scrambled material then each recording made will contain the decoder identification number. This information may be compared with decoder sales records to identify the decoder owner as an aid to tracing the source of unauthorized recordings. Other information, such as time and date, may be recorded along with the identification number.

Figure 10:
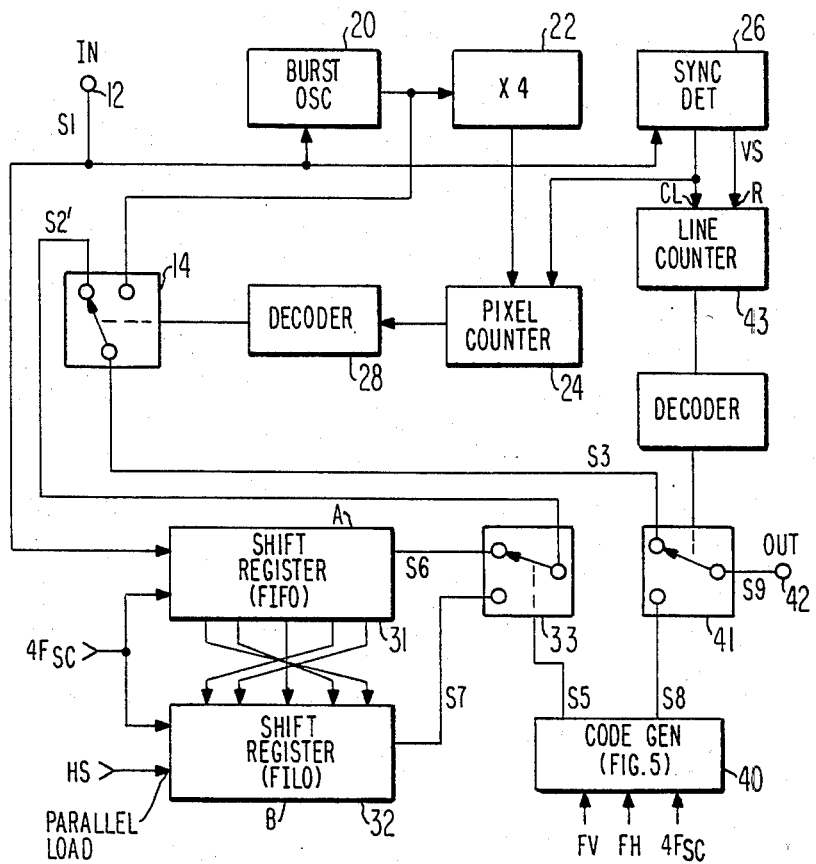
FIG. 10 is a block diagram illustrating a modification of the scrambler of FIG. 1.
Figure 11:
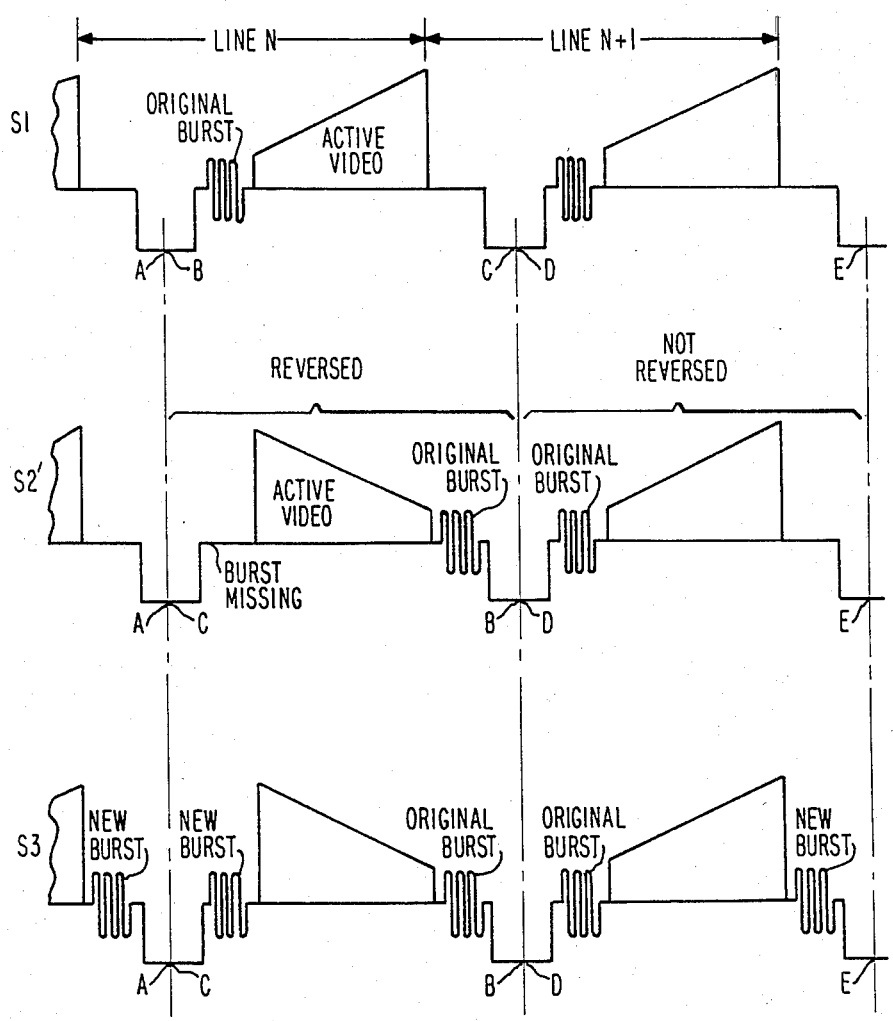
FIG. 11 is a waveform diagram illustrating operation of the scrambler of FIG. 10.

FIG. 10 illustrates a modification of the scrambler of FIG. 1 in which the extra burst signal is added to the scrambled signal after line reversal in memory 16. (See FIG. 11) rather than before line reversal (FIG. 2). The modification comprises connecting input terminal 12 directly to register 31, connecting the output of switch 33 to the previous S1 input of switch 14 and connecting the output of switch 14 to the input of switch 41. Operation of the modified scrambler is substantially the same as in the example of FIG. 1 except that burst is added after line reversal as shown in FIG. 11.

What is claimed is:

1. A video signal scrambler, comprising:
 a source for providing a composite video input signal having color burst and active video components;
 memory means for storing samples of said color burst and active video components of a given line of said input signal in sequential order of occurrence of said samples and for providing a scrambled output signal in which the order of samples of selected lines is reversed; and
 burst inserter means coupled to said memory means for effectively adding a further color burst component to said scrambled output signal such that each line of said scrambled output signal includes a pair of color burst components.

2. A scrambler as recited in claim 1 wherein said burst inserter means is coupled in a path between said source and said circuit means.

3. A scrambler as recited in claim 1 wherein said memory means stores said samples in sequential order from a selected point in the sync-tip interval of one line of said composite video input signal to a corresponding point of the sync-tip interval of a next following line.

4. A scrambler as recited in claim 1 wherein said memory means is coupled to control means for scrambling each display line of a given field of said composite video input signal.

5. A scrambler as recited in claim 1 wherein said pair of color burst components are symmetrically disposed with respect to said active video component in said scrambled output signal.

6. A scrambler as recited in claim 1 further comprising:
 a source for providing a scrambling code for controlling said memory means; and
 means for inserting said scrambling code in said scrambled output signal with inter-field and intra-field redundancy.

7. A video signal descrambler, comprising:
 input means for receiving a scrambled video input signal in which a given line includes two color burst components and an active video component and in which elements of said given line are reversed from an original sequence;
 memory means for storing said elements of said given line and for recovering the stored elements in said original sequence to provide a descrambled output signal; and color burst deleter means coupled to said memory means for removing one of said two color burst components from said descrambled output signal.

8. A descrambler as recited in claim 7 wherein said color burst deleter means is coupled to an output of said memory means.

9. A descrambler as recited in claim 7 wherein said memory means is coupled to control means for causing said memory means to reverse the sequence of elements of each display line of a given field of said output signal.

10. A descrambler as recited in claim 7 wherein said memory means stores samples is sequential order from a selected point in the sync-tip interval of said given line to a corresponding point of the sync-tip interval of a next following line.

11. A descrambler as recited in claim 7 wherein said scrambled video input signal includes a descrambling code having inter-field and intra-field redundancy and further comprising means for processing said descrambling code for controlling said memory means.

12. In a composite video signal scrambler of the type including means for reversing the time sequence of segments of a given line of a video input signal to provide a scrambled output signal in which selected lines comprise segments of reverse-sequence and other lines comprises segments of non-reversed sequence, the improvement, comprising:

first means for reversing the sequence of all segments associated with said given line; and second means for adding an extra burst signal to all lines of said scrambled output signal.

13. A scrambler as recited in claim 12, wherein said first means reverse segments between the center of the sync tip interval of said given line and the center of the sync tip interval of the next following line.

14. A scrambler as recited in claim 12 wherein said second means adds said extra burst signal to a front porch interval of a syachronizing component of said video output signal.

15. A scrambler as recited in claim 12, wherein said first means adds said extra burst signal to said scrambled output signal prior to reversal of said segment sequence by said first means.

16. A decoder, comprising:

first means having an input for receiving a scrambled composite video input signal in which each line includes two color burst components symmetrically disposed within said line and in which elements of selected lines are reverse ordered from sync-tip to sync-tip, said memory means having an output for providing an unscrambled video output signal in which said reverse ordered elements are restored to an original order; and burst remover means, coupled to a selected point in said memory means, for removing a selected one of said color burst components from each line of said unscrambled video output signal.

* * * * *